United States Patent [19]

Sano et al.

[11] Patent Number: 5,021,921
[45] Date of Patent: Jun. 4, 1991

[54] MONOLITHIC CERAMIC CAPACITOR

[75] Inventors: Harunobu Sano; Yoshiaki Kohno, both of Kyoto, Japan

[73] Assignee: Murata Manufacturing Co., Ltd., Japan

[21] Appl. No.: 549,215

[22] Filed: Jul. 6, 1990

[30] Foreign Application Priority Data

Jul. 7, 1989 [JP] Japan .................................. 1-176805

[51] Int. Cl.$^5$ ........................ H01G 4/10; H01G 7/00
[52] U.S. Cl. ..................................... 361/321; 29/25.42
[58] Field of Search .............. 29/25.42; 361/306, 308, 361/309, 310, 320, 321

[56] References Cited

U.S. PATENT DOCUMENTS

| | | | |
|---|---|---|---|
| 4,701,827 | 10/1987 | Fujikawa et al. | 361/309 |
| 4,881,308 | 11/1989 | McLaughlin et al. | 29/25.42 |
| 4,935,843 | 6/1990 | McLaughlin et al. | 361/321 |
| 4,956,744 | 9/1990 | Berghout et al. | 361/321 |

*Primary Examiner*—Donald A. Griffin
*Attorney, Agent, or Firm*—Ostrolenk, Faber, Gerb & Soffen

[57] ABSTRACT

Internal electrodes formed in the interior of a ceramic laminate of a monolithic ceramic capacitor comprise metal conductor parts and semiconductor parts. The semiconductor parts are exposed at both end surfaces of the ceramic laminate to be electrically connected with external electrodes. The external electrodes comprise baked layers of silver formed on the end surfaces of the ceramic laminate and metal plated films formed thereon. In formation of the metal plated films, a plating solution which may reach the end surfaces of the ceramic laminate through the baked layers is blocked by the semiconductor parts and prevented from infiltration into the metal conductor parts of the internal electrodes.

18 Claims, 1 Drawing Sheet

MONOLITHIC CERAMIC CAPACITOR

BACKGROUND OF THE INVENTION

1. Field of the Invention

The present invention relates to a monolithic ceramic capacitor, and more particularly, it relates to an improvement in the structure of a connection between the internal and external electrodes.

2. Description of the Background Art

In general, a monolithic ceramic capacitor comprises a ceramic laminate including a plurality of stacked dielectric ceramic layers, a plurality of internal electrodes which are arranged between adjacent ones of the dielectric ceramic layers, and external electrodes which are formed on both end surfaces of the ceramic laminate and electrically connected with related ones of the internal electrodes.

The internal electrodes have generally been made of a metal which is not molten at a temperature which is appropriate for sintering the dielectric ceramic layers and not oxidized even if the same is fired under such high oxygen partial pressure that the ceramic material is not brought into a semiconductor state. The external electrodes have been formed by applying silver paste, which contains silver powder, for example, onto prescribed surfaces of the fired ceramic laminate having the internal electrodes embedded therein and baking the same.

The external electrodes of such a monolithic ceramic capacitor are typically soldered to a wiring substrate, to electrically connect the monolithic ceramic capacitor with the wiring substrate. However, it has been recognized that when soldered a noble metal, such, as silver, forming the external electrodes is melted and incorporated into the solder in the so-called solder leaching phenomenon. Such solder leaching leads to a reduction in the quality of the monolithic ceramic capacitor. Thus, the external electrodes have generally been covered with plating films of a metal, such as nickel or copper, which is resistant against heat and hardly melts when soldered. Further, an attempt has recently been made to plate such metal plating solder, in order to improve solderability.

As hereinabove described, the plating films of the metal such as nickel or copper formed on the external electrodes are effective for preventing solder leaching, and the plating films of solder are effective for improving solderability. However, the electrical properties of the monolithic ceramic capacitor are reduced by such means. In more concrete terms, metal baking layers formed on both end surfaces of the ceramic laminate for defining the external electrodes. These layers are generally in porous states with fine voids. When such metal baking layers are dipped in a plating solution for forming the metal plating films, the plating solution infiltrates into the voids of the metal baking layers. This plating solution is diffused to reach junction interfaces between the internal electrodes and the dielectric ceramic layers, and reduces junction strength at the junction interfaces while changing dielectric constants, insulation resistance etc. of the dielectric ceramic layers Consequently, the electrical properties of the monolithic ceramic capacitor are reduced.

In the ceramic laminate for the monolithic ceramic capacitor, the junction interfaces between the internal electrodes and the dielectric ceramic layers are exposed to the exterior in a stage before formation of the external electrodes. In such a ceramic laminate, cracks are easily caused along the junction interfaces, which are inferior in mechanical strength to other portions. If bending stress or impact is applied to the ceramic laminate, therefore, cracks may be caused along the junction interfaces which may separate the internal electrodes from the dielectric ceramic layers in the worst case. The aforementioned bending stress and impact are often applied to the ceramic laminate when the step of forming the external electrodes on the ceramic laminate is carried out with an automatic machine. The cracks along the junction interfaces reduce the life of the monolithic ceramic capacitor.

SUMMARY OF THE INVENTION

Accordingly, an object of the present invention is to provide a monolithic ceramic capacitor, which can avoid the problems of infiltration of the plating solution and cracks that may be caused in the junction interfaces between the internal electrodes and the dielectric ceramic layers.

The monolithic ceramic capacitor according to the present invention comprises a ceramic laminate. This ceramic laminate has first and second opposite end surfaces. First and second internal electrodes are arranged in the interior of the ceramic laminate, to be opposite to each other and separated by a layer of ceramic material. The first and second internal electrodes are exposed from the ceramic laminate, to be accessible for electrical connection at the first and second end surfaces respectively. First and second external electrodes are formed on the first and second surfaces of the ceramic laminate. The first and second external electrodes are electrically connected with the first and second internal electrodes respectively.

Each of the first and second internal electrodes comprises a metal conductor part and a semiconductor part which are flush with each other. The first and second internal electrodes are exposed at the first and second end surfaces and electrically connected with the first and second external electrodes at their semiconductor parts.

The first and second external electrodes preferably include first and second metal baking layers containing conductive metal powder, which are formed on the first and second end surfaces of the ceramic laminate, and first and second metal plating films, which are formed on the first and second metal baking layers, respectively.

Further, the first and second external electrodes may include first and second semiconductor layers, which are formed on the first and second end surfaces of the ceramic laminate, and first and second metal plating films, which are formed on the first and second semiconductor layers, respectively.

The aforementioned semiconductor parts partially defining the internal electrodes and the semiconductor layers partially defining the external electrodes are formed by bringing a ceramic material into a semiconductor state, for example. In this case, a method of applying a semiconductorizing agent to prescribed parts of the ceramic material contained in the ceramic laminate and bringing the prescribed parts into semiconductor states simultaneously with the firing of the ceramic material. Another method of applying paste containing of a ceramic material which is substantially identical to that contained in the ceramic laminate and a semiconductorizing agent to prescribed parts of the ceramic laminate and bringing the paste into a semiconductor state simultaneously with the firing of the ceramic laminate.

According to the present invention, the internal electrodes are electrically connected with the external electrodes at the semiconductor parts. Thus, the metal conductor parts of the internal electrodes are structurally separated by the semiconductor parts from external electrodes. The semiconductor parts can be formed of a ceramic material which is brought into a semiconductor state, to substantially conform the respective materials of the semiconductor parts and dielectric ceramic layers provided in the ceramic laminate with each other.

Therefore, a plating solution used for forming the metal plating films on the external electrodes is prevented from infiltration into the interior of the ceramic laminate. Thus, the monolithic ceramic capacitor can be prevented from the above described deterioration of its electrical properties with no residual plating solution in the interior of the ceramic laminate, and the reliability of the monolithic ceramic capacitor can be improved.

The semiconductor parts of the internal electrodes are adapted to improve the strength of the junction interfaces between the internal electrodes and the dielectric ceramic layers. Since such semiconductor parts appear on the end surfaces of the ceramic laminate, the junction strength between the internal electrodes and the dielectric ceramic layers is improved particularly at such end surfaces. Therefore, even if a bending, stress or impact is applied to the ceramic laminate during formation of the external electrodes or the like, no cracks occur along the junction interfaces between the internal electrodes and the dielectric ceramic layers, so no separation of the internal, electrodes from the dielectric ceramic layers is caused. Thus, the life of the monolithic ceramic capacitor can be extended.

These and other objects, features, aspects and advantages of the present invention will become more apparent from the following detailed description of the present invention when taken in conjunction with the accompanying drawings.

DESCRIPTION OF THE PREFERRED EMBODIMENTS

Example 1

Figure 1:
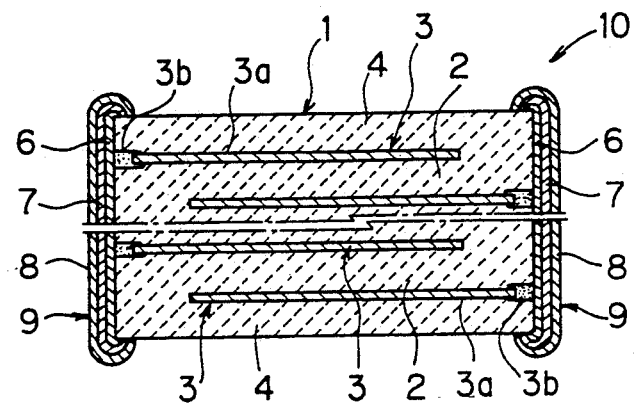
FIG. 1 is a longitudinal sectional view showing a monolithic ceramic capacitor according to an embodiment of the present invention.

Referring to FIG. 1, a monolithic ceramic capacitor 10 comprises a ceramic laminate 1 which is formed by stacking a plurality of dielectric ceramic layers 2 with interposition of internal electrodes 3. External electrodes 9 are formed on both end surfaces of the ceramic laminate 1. According to this Example, the ceramic capacitor 10 is a chip-type capacitor which is in the form of a rectangular parallelepiped.

Each of the internal electrodes 3 comprises a metal conductor part 3a and a semiconductor part 3b, which are flush with each other. The semiconductor parts 3b are exposed at the end surfaces of the ceramic laminate 1, and electrically connected with the external electrodes 9.

The external electrodes 9 comprise baking layers 6 of a metal such as silver, for example, which are formed on the end surfaces of the ceramic laminate 1. Plating films 7 of a metal such as nickel or copper, for example, are further formed on the metal baking layers 6.

The monolithic ceramic capacitor 10 is will now described in more detail along in connection with its manufacturing steps.

Figure 2:
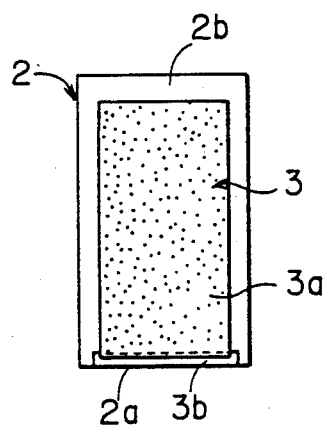
FIG. 2 is a plan view showing one dielectric ceramic layer included in the monolithic ceramic capacitor shown in FIG. 1.
Figure 3:
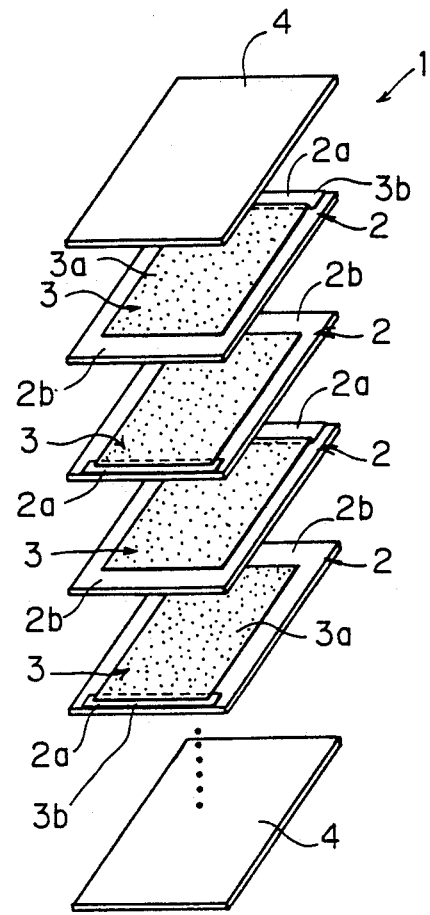
FIG. 3 is an exploded perspective view showing the dielectric ceramic layers included in the ceramic laminate shown in FIG. 1.

First, the ceramic laminate 1 is prepared. As shown in FIG. 2, the ceramic laminate 1 comprises a dielectric ceramic layer (green sheet) 2, which is obtained by slurrying material powder and sheeting this slurry. Paste containing a metal such as palladium is applied onto one surface of the dielectric ceramic layer 2 to form the metal conductor part 3a, while another paste which is prepared by mixing a binder into a semiconductorizing agent is applied to the same surface to form the semiconductor part 3b. A plurality of such dielectric ceramic layers 2, which are provided with the internal electrodes 3 comprising the metal conductor parts 3a and the semiconductor parts 3b, are stacked as shown in FIG. 3. In the stage of such stacking, the dielectric ceramic layers 2 provided with the internal electrodes 3 are held between dielectric ceramic layers 4 which are provided with no internal electrodes. The ceramic laminate 1 obtained in the aforementioned manner is compressed along the direction of stacking, and then fired.

As described above, the paste employed for forming the semiconductor parts 3b of the internal electrodes 3 may be prepared by mixing a binder into a semiconductorizing agent for bringing prescribed parts of the dielectric ceramic layers 2 into semiconductor states, or by mixing powder of a ceramic material which is substantially identical to that contained in the dielectric ceramic layers 2 with a semiconductorizing agent and a binder.

Then, the external electrodes 9 are formed on both end surfaces of the fired ceramic laminate 1. The metal baking layers 6, serving as first layers of the external electrodes 9, are formed by applying conductive paste containing powder of a metal such as silver onto the end surfaces of the ceramic laminate 1 and baking the same. The first plating films 7, serving as second layers of the external electrodes 9, are formed by plating the metal baking layers 6 with a metal such as nickel or copper. The second plating films 8, serving as third layers of the external electrodes 9, are formed by plating the plating films 7 with solder or a metal such as tin.

Thus, the chip-type monolithic ceramic capacitor 10 is obtained.

An experimental Experimental Example of the present invention is now described in more concrete terms.

A ceramic material for forming the dielectric ceramic layers 2 was prepared from mixed powder, which was obtained by adding 0.07 percent by weight of $MnCO_3$ to 100 percent by weight of a mixture of 84.35 mole percent of $BaTiO_3$ and 15.65 mole percent of $BaZrO_3$. A binder of polyvinyl alcohol was added to the mixed powder, and then the mixed powder was kneaded with addition of a surface active agent, a dispersing agent and water, to obtain slurry. Then this slurry was sheeted by a doctor blade coater, to obtain a green sheet of 35 μm in thickness. Sheets for defining the dielectric ceramic layers 2 and 4 were obtained from this green sheet.

Palladium paste was printed on first surfaces of the sheets for defining the dielectric ceramic layers 2 by screen printing, to form the metal conductor parts 3a. Paste containing 10 percent by weight of a semiconductorizing agent of $La_2O_3$ with ethyl cellulose resin and a solvent of butyl cellosolve was printed on first end portions 2a (FIGS. 2 and 3) of the sheets for defining the dielectric ceramic layers 2 by screen printing.

Then, the dielectric ceramic layers 2 were stacked with the dielectric ceramic layers 4, as shown in FIG. 3. At this time, the dielectric ceramic layers 2 were so stacked as to alternately locate the first end portions 2a printed with the paste containing the semiconductorizing agent and second end portions 2b on which no such paste was printed. The ceramic laminate 1 thus formed was compressed under heating. In this ceramic laminate 1, no metal conductor parts 3a were exposed at the end portions 2a and 2b.

Then the ceramic laminate 1 was dried and thereafter fired in the air at 1300° C. for two hours, to bring the dielectric ceramic layers 2 into ceramic states and form the semiconductor parts 3b at the same time. Thus, the semiconductorizing agent was diffused into prescribed parts of the dielectric ceramic layers 2, to provide the ceramic laminate 1 with the internal electrodes 3 having the semiconductor parts 3b and the metal conductor parts 3a which were electrically connected with each other.

Then, the external electrodes 9 were formed on both end surfaces of the ceramic laminate 1 in the following manner: First, silver paste was applied onto both end surfaces of the ceramic laminate 1 and baked in the air at 800° C., to form the metal baking layers 6. Then, the plating films 7 were formed on the metal baking layers 6. The plating films 7 were formed by barrel plating using a nickel plating solution containing nickel sulfate (replaceable by nickel chloride) and boric acid. Finally the plating films 8 were formed on the plating films 7. The plating films 8 were formed by barrel plating using a solder plating solution with a solvent of alkanol sulfonic acid.

The monolithic ceramic capacitor 10 obtained in the aforementioned manner had a sectional structure as shown in FIG. 1, and dimensions etc. thereof were as follows:

Outside Dimensions
  Width: 3.2 mm
  Length: 1.6 mm
  Thickness: 1.2 mm
Thickness of Dielectric Ceramic Layers: 20 μm
Number of Effective Dielectric Ceramic Layers: 19
Opposite Area of Each Pair of Internal Electrodes: 1.3 mm²

Then, the monolithic ceramic capacitor 10 according to Example 1 was tested in comparison with a reference monolithic ceramic capacitor, which was different from the inventive capacitor only in a point that internal electrodes thereof were provided with only metal conductor parts, under the same conditions, in order to evaluate electrical properties. Samples for the tests were prepared by those having external electrodes 9 provided with only metal baking layers 6 (after silver baking) and those having external electrodes 9 provided with metal baking layers 6 and plating films 7 and 8 (after solder plating) for both of Example 1 and reference example, in order to evaluate difference caused by presence/absence of the semiconductor parts 3b.

In order to measure capacitance (C) and dielectric loss (tan δ), an automatic bridge measuring apparatus was used to apply voltages of 1 kHz and 1 Vrms to each sample. Further, a voltage of 50 V was applied for two minutes by an insulation resistance tester, in order to measure insulation resistance (R). A CR product was evaluated from the capacitance (C) and the insulation resistance (R) thus obtained.

Table 1 shows the results of measurement in the aforementioned tests.

TABLE 1

| | Result | | | | | |
|---|---|---|---|---|---|---|
| | Reference Example | | | Example 1 | | |
| Sample | Capacitance C (μF) | Dielectric Loss tan δ (%) | CR Product (ΩF) | Capacitance C (μF) | Dielectric Loss tan δ (%) | CR Product (ΩF) |
| After Silver Baking | 0.16 | 1.6 | 5000 | 0.16 | 1.7 | 5000 |
| After Solder Plating | 0.10 | 10 | 200 | 0.16 | 1.7 | 5000 |

As understood from Table 1, the inventive sample after solder plating still maintained electrical properties which were evaluated after silver baking, to prove high reliability.

Comparing the results of measurement after solder plating with those after silver baking, the capacitance (C) was reduced from 0.16 μF to 0.10 μF and the dielectric loss (tan δ) was increased from 1.6% to 10% in the reference example. Further, it is recognized that the CR product of the reference example was extremely reduced from 5000 ΩF to 200 ΩF. Thus, the electrical properties of reference example were extremely deteriorated due to formation of the plating films 7 and 8. This substantiates that the plating solution was diffused into the interior of the ceramic laminate 1 through the metal baking layers 6 in formation of the plating films 7 and 8.

In each of the inventive samples after silver baking and after solder plating, on the other hand, the capacitance (C) was 0.16 μF, the dielectric loss (tan δ) was 1.7% and the CR product was 5000 ΩF. Thus, according to Example 1, absolutely no difference was recognized between the electrical properties of the samples after silver baking and after solder plating. Thus, even if the plating solution infiltrates into the metal baking layers 6 in formation of the plating films 7 and 8, the plating solution is prevented by the semiconductor parts 3b from diffusion into the interior of the ceramic laminate 1.

Example 2

Figure 4:
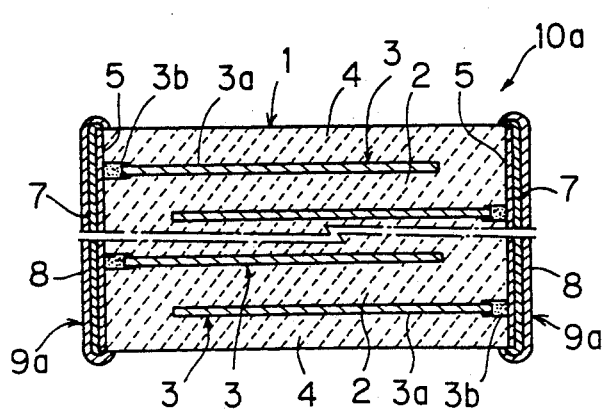
FIG. 4 is a longitudinal sectional view showing a monolithic ceramic capacitor according to another embodiment of the present invention.

FIG. 4 is a longitudinal sectional view corresponding to FIG. 1, showing a monolithic ceramic capacitor 10a according to Example 2 of the present invention. The monolithic ceramic capacitor 10a shown in FIG. 4 includes a number of elements which are common with those of the monolithic ceramic capacitor 10 shown in FIG. 1. Therefore, the common elements are denoted by similar reference numerals, to omit redundant description.

Referring to FIG. 4, the monolithic ceramic capacitor 10a is different in structure from the monolithic ceramic capacitor 10 shown in FIG. 1 in relation to external electrodes 9a. The external electrodes 9a comprise semiconductor layers 5, in place of the metal baking layers 6 shown in FIG. 1. These semiconductor layers 5 are formed by applying paste which is prepared by mixing a binder into a semiconductorizing agent onto both end surfaces of an unfired ceramic laminate 1 and thereafter firing the ceramic laminate 1.

Similarly to Example 1, the monolithic ceramic capacitor 10a was experimentally manufactured on the basis of Example 2. Manufacturing steps were similar to those of Example 1, except for the following points:

After the unfired ceramic laminate 1 was obtained, the same paste as that containing a semiconductorizing agent used for forming semiconductor parts 3b was applied onto both end surfaces of the ceramic laminate 1, and then dried. This ceramic laminate 1 was fired in the air at 1300° C. for two hours to bring dielectric ceramic layers 2 into ceramic states and form the semiconductor parts 3b while simultaneously forming the semiconductor layers 5. Thus, the ceramic laminate 1 was brought into such a structure that the semiconductor layers 5 were electrically connected with metal conductor parts 3a through the semiconductor parts 3b. Thereafter plating films 7 and 8 were formed similarly to Example 1.

In order to examine the influence exerted on the properties of the monolithic ceramic capacitor by plating for forming the external electrodes, samples were prepared from that provided with external electrodes having plating films 7 and 8 on semiconductor layers 5 (after solder plating) as hereinabove described and shown in FIG. 4, and that provided with no plating films 7 and 8 (unplated). As to the latter sample (unplated), silver paste was applied onto semiconductor layers 5 and then baked to form silver baking layers, in order to measure the properties. Items and conditions of measurement were similar to those of Example 1. Table 2 shows the results of the measurement.

TABLE 2

| Sample | Result Example 2 | | |
|---|---|---|---|
| | Capacitance C (μF) | Dielectric Loss tan δ (%) | CR Product (ΩF) |
| Unplated | 0.16 | 1.6 | 5000 |
| After Solder Plating | 0.16 | 1.6 | 5000 |

As understood from Table 2, the electrical properties evaluated after formation of the semiconductor layers 5 were still maintained after formation of the plating films 7 and 8 according to Example 2 similarly to Example 1, to prove high reliability. Comparing the results of measurement of the unplated sample with those of the sample after solder plating, it is understood that absolutely no change was caused in capacitance (C), dielectric loss (tan δ) and CR product by formation of the plating films 7 and 8.

According to Example 1, at least the semiconductor parts 3b are located between the metal conductor parts 3a of the internal electrodes 3 and the solder plating films 8. According to Example 2, at least the semiconductor parts 3b and the semiconductor layers 5 are located between the metal conductor parts 3a of the internal electrodes 3 and the solder plating films 8. Due to such presence of the semiconductor parts 3b and the semiconductor layers 5, the following effects can be expected:

Tin, which is the main component of solder forming the solder plating films 8, is easily alloyed with a number of metals in general, and such a tendency is particularly remarkable under a high temperature. Such an alloying phenomenon of tin spreads toward the interior of the ceramic laminate to affect the internal electrodes, whereby the electrical properties of the capacitor such as the dielectric constant and capacitance may be remarkably deteriorated. However, the aforementioned alloying phenomenon of tin is advantageously prevented by the semiconductor parts 3b according to Example 1 and by the semiconductor parts 3b and the semiconductor layers 5 according to Example 2, so that no alloying phenomenon of tin spreads toward the metal conductor parts 3a of the internal electrodes 3. Thus, the electrical properties of the monolithic ceramic capacitors 10 and 10a are maintained stable.

While the present invention has been described in relation to the shown in the drawings, various modifications are available within the scope of the present invention.

For example, the semiconductorizing agent for forming the semiconductor parts 3b and the semiconductor layers 5 may be prepared from a material other than the aforementioned La$_2$O$_3$ material Further, the ceramic material for the dielectric ceramic layers 2 may also be prepared from a material other than that illustrated above.

In Example 2 shown in FIG. 4, the semiconductorizing agent may be applied onto both end surfaces of the ceramic laminate 1 by a method such as sputtering, vapor deposition, spraying, dipping or the like in place of coating, in order to form the semiconductor layers 5. Such a method can also be employed for forming conductive layers corresponding to the metal baking layers 6 in Example 1 shown in FIG. 1.

Although the present invention has been described and illustrated in detail, it is clearly understood that the same is by way of illustration and example only and is not to be taken by way of limitation, the scope of the present invention being limited only by the terms of the appended claims.

What is claimed is:

1. A monolithic ceramic capacitor comprising:
   a ceramic laminate having first and second opposite end surfaces and first and second internal electrodes disposed in its interior so as to be opposite to each other and separated by a layer of ceramic material, said first and second internal electrodes being exposed at said first and second end surface, respectively, so as to be accessible for electrical connection; and
   first and second external electrodes respectively formed on said first and second end surfaces of said ceramic laminate and electrically connected with said first and second internal electrodes respectively,
   said first and second internal electrodes each comprising metal conductor parts and semiconductors parts which are flush with each other, so that said semiconductor parts of said first and second internal electrodes are exposed at said first and second end surfaces and electrically connected with said first and second external electrodes respectively.

2. A monolithic ceramic capacitor in accordance with claim 1, wherein said first and second external electrodes include first and second metal baked layers containing conductive metal powder provided on said first and second end surfaces of said ceramic laminate respectively.

3. A monolithic ceramic capacitor in accordance with claim 2, wherein said first and second external electrodes further include first and second metal plated films provided on said first and second metal baked layers respectively.

4. A monolithic ceramic capacitor in accordance with claim 1, wherein said semiconductor parts are formed of a ceramic material being brought into a semiconductor state.

5. A monolithic ceramic capacitor in accordance with claim 4, wherein said ceramic material is brought into a semiconductor state by applying a semiconductorizing agent thereto.

6. A monolithic ceramic capacitor in accordance with claim 1, wherein said first and second external electrodes include first and second semiconductor layers (5) formed on said first and second end surfaces of said ceramic laminate and first and second metal plated films formed on said first and second semiconductor layers respectively.

7. A monolithic ceramic capacitor in accordance with claim 6, wherein said semiconductor layers are formed of a ceramic material being brought into a semiconductor state.

8. A monolithic ceramic capacitor in accordance with claim 7, wherein said ceramic material is brought into a semiconductor state by applying a semiconductorizing agent thereto.

9. A monolithic ceramic capacitor in accordance with claim 8, wherein said agent is applied by a method selected from the group consisting of coating with a mixture of said agent and a binder, sputtering, vapor disposition, spraying, and dipping.

10. A monolithic ceramic capacitor in accordance with claim 1, wherein said semiconductor parts are formed by applying to said ceramic laminate a paste which contains a semiconductorizing agent and a powder of a ceramic material substantially identical to that contained in the ceramic laminate.

11. A method of manufacturing a monolithic ceramic capacitor comprising the steps of:

assembling a ceramic laminate having first and second opposite end surfaces and first and second internal electrodes disposed in its interior so as to be opposite to each other and separated by a layer of ceramic material, said first and second internal electrodes being exposed at said first and second end surfaces, respectively, so as to be accessible for electrical connection;

said first and second internal electrodes each comprising metal conductor parts and semiconductor parts which are flush with each other, so that said semiconductor parts of said first and second internal electrodes are exposed at said first and second end surfaces and electrically connected with said first and second external electrodes respectively; and forming first and second external electrodes respectively on said first and second end surfaces of said ceramic laminate and electrically connected with said first and second internal electrodes respectively.

12. A method in accordance with claim 11, wherein said semiconductor parts are formed by bringing a ceramic material into a semiconductor state.

13. A method in accordance with claim 12, wherein said ceramic material is brought into a semiconductor state by applying a semiconductorizing agent thereto.

14. A method in accordance with claim 11, wherein said semiconductor parts are formed by applying to said ceramic laminate a paste which contains a semiconductorizing agent and a powder of a ceramic material substantially identical to that contained in the ceramic laminate.

15. A method in accordance with claim 11, wherein said first and second external electrodes include first and second semiconductor layers formed on said first and second end surfaces of said ceramic laminate and first and second metal plated films formed on said first and second semiconductor layers respectively.

16. A method in accordance with claim 15, wherein said semiconductor layers are formed by bringing a ceramic material into a semiconductor state.

17. A method in accordance with claim 16, wherein said ceramic material is brought into a semiconductor state by applying a semiconductorizing agent thereto.

18. A method in accordance with claim 17, wherein said agent is applied by a method selected from the group consisting of coating with a mixture of said agent and a binder, sputtering, vapor disposition, spraying, and dipping.

* * * * *